(12) United States Patent
Lin et al.

(10) Patent No.: US 12,228,746 B2
(45) Date of Patent: Feb. 18, 2025

(54) MAGNETIC DRIVING ASSEMBLY AND STABILIZATION DRIVING DEVICE

(71) Applicant: Lanto Electronic Limited, Kunshan (CN)

(72) Inventors: Mengting Lin, Kunshan (CN); Fuyuan Wu, Kunshan (CN); Shangyu Hsu, Kunshan (CN); Yucheng Lin, Kunshan (CN); Wenyen Huang, Kunshan (CN)

(73) Assignee: LANTO ELECTRONIC LIMITED, Kunshan (CN)

( * ) Notice: Subject to any disclaimer, the term of this patent is extended or adjusted under 35 U.S.C. 154(b) by 670 days.

(21) Appl. No.: 17/532,384

(22) Filed: Nov. 22, 2021

(65) Prior Publication Data

US 2022/0244563 A1    Aug. 4, 2022

(30) Foreign Application Priority Data

Feb. 3, 2021   (CN) .......................... 202110152162.7

(51) Int. Cl.
| | |
|---|---|
| G02B 27/64 | (2006.01) |
| G03B 5/00 | (2021.01) |
| H02K 11/215 | (2016.01) |
| H02K 11/33 | (2016.01) |
| H02K 41/035 | (2006.01) |

(52) U.S. Cl.
CPC ............ *G02B 27/646* (2013.01); *G03B 5/00* (2013.01); *H02K 11/215* (2016.01); *H02K 11/33* (2016.01); *H02K 41/0356* (2013.01); *G03B 2205/0007* (2013.01); *G03B 2205/0015* (2013.01); *G03B 2205/0023* (2013.01); *H02K 2201/18* (2013.01)

(58) Field of Classification Search
None
See application file for complete search history.

(56) References Cited

U.S. PATENT DOCUMENTS

| | | | |
|---|---|---|---|
| 2015/0198817 A1 | 7/2015 | Zhou | |
| 2017/0336699 A1* | 11/2017 | Hu | .......................... G03B 13/36 |
| 2020/0249493 A1* | 8/2020 | Yang | ........................ G03B 5/00 |

FOREIGN PATENT DOCUMENTS

| | | | |
|---|---|---|---|
| CN | 108153081 A | | 8/2018 |
| CN | 211266959 U | * | 8/2020 |
| CN | 212135039 U | | 12/2020 |

* cited by examiner

*Primary Examiner* — Clayton E. LaBalle
*Assistant Examiner* — Diana Hancock
(74) *Attorney, Agent, or Firm* — Birch, Stewart, Kolasch & Birch, LLP

(57) ABSTRACT

Provided are a magnetic driving assembly and a stabilization driving device. The magnetic driving assembly includes a frame body, a magnetic piece, a coil carrier plate and multiple coils. The magnetic piece is disposed on the frame body, the coil carrier plate is disposed to be separated from the frame body, and the multiple coils are disposed to correspond to the magnetic piece, and an end of the coil carrier plate in a first direction is provided with at least one of the multiple coils configured to drive the coil carrier plate to linearly move in the first direction; an end of the coil carrier plate in a second direction is provided with at least two of the multiple coils configured to drive the coil carrier plate selectively to move linearly in the second direction or rotate around a third direction.

17 Claims, 3 Drawing Sheets

MAGNETIC DRIVING ASSEMBLY AND STABILIZATION DRIVING DEVICE

CROSS-REFERENCE TO RELATED APPLICATIONS

This application claims priority to Chinese patent application No. 202110152162.7 filed with the China National Intellectual Property Administration (CNIPA) on Feb. 3, 2021, the disclosure of which is incorporated herein by reference in its entirety.

TECHNICAL FIELD

The present disclosure relates to the technical field of driving devices, and in particular, a magnetic driving assembly and a stabilization driving device.

BACKGROUND

An optical camera generally and mainly includes a lens, a sensor, a flexible printed circuit (FPC) soft board, an image processing chip and other structures. The key components for determining whether a camera is good or bad are the lens, the image processing chip and the sensor. Meanwhile, the stabilization performance also has a great impact on the shooting effect, especially when shooting in a motion state. In recent years, the optical stabilization technology in mobile phones continuously tends to be perfect.

The camera in existing digital products such as a mobile phone is provided with an optical stabilization lens driving device which generally depends on a Hall magnet to measure a position offset of the lens and supplies a suitable current to a stabilization coil, so as to enable the lens to return to the original position. In addition to moving the lens back to the original position, the existing optical stabilization electronic product adopting the sensor shift achieves the stabilization effect by adjusting the position of the sensor. However, the camera of the existing mobile phone equipment usually only has the stabilization function for position adjustment of up-down translation and left-right translation, and the rotation deviation may also occur in actual use. Therefore, the stabilization function of this kind of mobile phone equipment cannot well satisfy the use requirements.

Therefore, there is an urgent need to provide a magnetic driving assembly and an electronic device for a stabilization driving device.

SUMMARY

An object of the present disclosure is to provide a magnetic driving assembly, which can provide a rotational movement on the premise of achieving a translational movement.

For this purpose, the present disclosure adopts the following technical schemes.

A magnetic driving assembly includes a frame body, a magnetic piece, a coil carrier plate and multiple coils. The magnetic piece is disposed on the frame body, the coil carrier plate is disposed to be separated from the frame body, and the multiple coils are disposed to correspond to the magnetic piece, and an end of the coil carrier plate in a first direction is provided with at least one coil configured to drive the coil carrier plate to linearly move in the first direction; an end of the coil carrier plate in a second direction is provided with at least two coils configured to drive the coil carrier plate selectively to move linearly in the second direction or rotate around a third direction. The first direction, the second direction and the third direction are perpendicular to one another, and the third direction is perpendicular to the coil carrier plate.

The magnetic driving assembly may further include a control assembly. The control assembly is in an electrical control connection with the multiple coils and is configured to control a magnitude and a direction of a current in each coil.

The coils may include six coils. Two ends of the coil carrier plate in the first direction are respectively provided with one of the six coils, and two ends of the coil carrier plate in the second direction are respectively provided with two of the six coils.

When currents in the two of the multiple coils disposed on one of the two ends of the coil carder plate in the second direction have the same direction, the coil carrier plate is driven to linearly move in the second direction; and when currents in the two of the multiple coils disposed on one of the two ends of the coil carrier plate in the second direction have opposite directions, the coil carder plate is driven to rotate around the third direction.

The magnetic piece may include multiple magnetic pieces, two ends of the frame body in the first direction are respectively provided with one of the multiple magnetic pieces, and two ends of the frame body in the second direction are respectively provided with one of the multiple magnetic pieces, the one coil disposed on any end of the coil carrier plate in the first direction is located between the coil carrier plate and a respective one of the multiple magnetic pieces disposed on the frame body in the first direction, and the two coils disposed on any end of the coil carrier plate in the second direction are located between the coil carrier plate and a respective one of the multiple magnetic pieces disposed on the frame body in the second direction.

The multiple magnetic pieces may be bipolar magnets, one pole of each magnetic piece faces an inner side of the frame body, the other pole of each magnetic piece faces an outer side of the frame body, and poles of the magnetic pieces facing the inner side of the frame body have the same polarity.

Each magnetic piece disposed on the two ends of the frame body in the second direction may have a long-strip-shaped structure extending towards the first direction and two poles in the second direction, and the two coils disposed on any end of the coil carrier plate in the second direction are arranged side by side in the first direction and adjacent in one-to-one correspondence to two ends of a respective one of the multiple magnetic pieces in the first direction, respectively.

The magnetic driving assembly may further include an upper housing and an elastic connecting piece. The frame body is disposed in an accommodation space of the upper housing. The coil carrier plate is connected to the upper housing through the elastic connecting piece such that the coil carrier plate is movably disposed on a side of the frame body facing away from the upper housing.

Another object of the present disclosure is to provide a stabilization driving device, which can provide rotation-displacement driving on the premise of achieving the translation stabilization, thereby achieving rotation stabilization.

For this purpose, the present disclosure adopts the following technical schemes.

A stabilization driving device includes the magnetic driving assembly described above. The stabilization driving device further includes a Hall magnet. The Hall magnet is disposed on the frame body or the coil carrier plate, and the Hall magnet is configured to detect a position of the frame body relative to the coil carrier plate.

The stabilization driving device may further include a lens assembly and an image sensor. The lens assembly is disposed on the frame body. The image sensor is disposed on the coil carrier plate, and the image sensor is configured to receive optical information from the lens assembly.

The beneficial effects of the present disclosure are as follows.

The magnetic driving assembly of the present disclosure has advantages that the end of the coil carrier plate in the first direction is provided with the at least one coil configured to drive the coil carrier plate to linearly move in the first direction; the end of the coil carrier plate in the second direction is provided with at least two coils configured to drive the coil carrier plate selectively to move linearly in the second direction or rotate around the third direction, and thus the magnetic driving assembly can provide the rotational movement on the premise of achieving translational movement in the first direction and the second direction, so as to adjust the position of the coil carrier plate. Therefore, the stabilization driving device adopting the magnetic driving assembly can achieve the rotation stabilization on the premise of achieving the translation stabilization in the first direction and the second direction, and also the adjustment of the position of the coil carrier plate.

Figure 1:
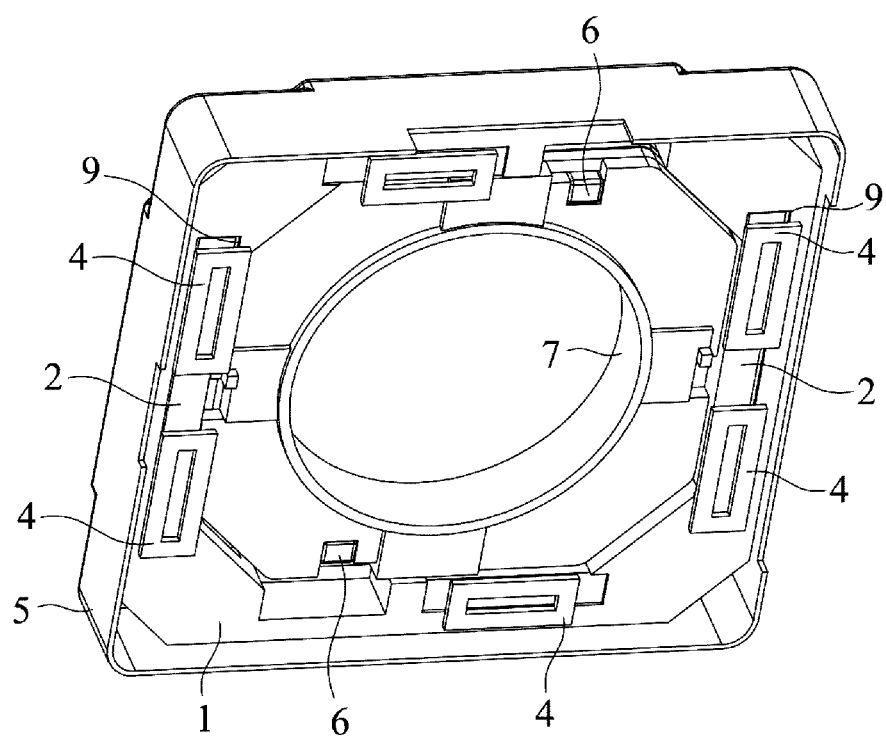
FIG. 1 is a schematic view of part of structures of a stabilization driving device provided in the present disclosure.

X—first direction; Y—second direction; Z—third direction;
1—frame body; 2—magnetic piece; 3—coil carrier plate; 4—coil; 5—upper housing; 6—Hall magnet; 7—lens bracket; 8—image sensor; 9—accommodation groove.

DETAILED DESCRIPTION

In order to make technical schemes adopted by the present disclosure, and technical effects achieved by the present disclosure more clear, the technical schemes of the present disclosure will be further described below with reference to the drawings and specific implementations.

In the description of the present disclosure, unless expressly specified or limited otherwise, the terms "coupled", "connected", and "fixed" are to be construed broadly, for example, which may mean fixedly connected, detachably connected, or integrated; may mean mechanically connected or electrically connected; may mean directly connected, indirectly connected through an intermediate medium, or may mean inside connection of two elements or the interaction between two elements. The specific meanings of the above terms in the present disclosure may be understood according to the specific circumstances by those of ordinary skill in the art.

In the present disclosure, unless expressly specified or limited otherwise, a first feature being "on" or "under" a second feature may include the first feature and the second feature being in direct contact, or may include the first feature and the second feature not being in direct contact but being in contact with each other through additional features therebetween. Moreover, the first feature being "on", "above" and "over" the second feature includes the first feature being directly above and obliquely above the second feature, or simply indicates the first feature being at a higher level than the second feature. The first feature being "under", "below" and "beneath" the second feature includes the first feature being directly below and obliquely below the second feature, or simply represents the first feature being at a lower level than the second feature.

In the description of the present embodiment, orientations or positional relationships of the terms "upper", "lower", "left", "right", etc. are based on the orientations or positional relationships shown in the drawings, and are merely for the convenience of description and simplification of operations, and do not indicate or imply that the devices or elements referred to must have a particular orientation, be constructed and operated in the particular orientation, and thus should not be construed as limiting the present disclosure. Furthermore, the terms "first" and "second" are used merely to distinguish between descriptions and have no special meaning.

Figure 2:
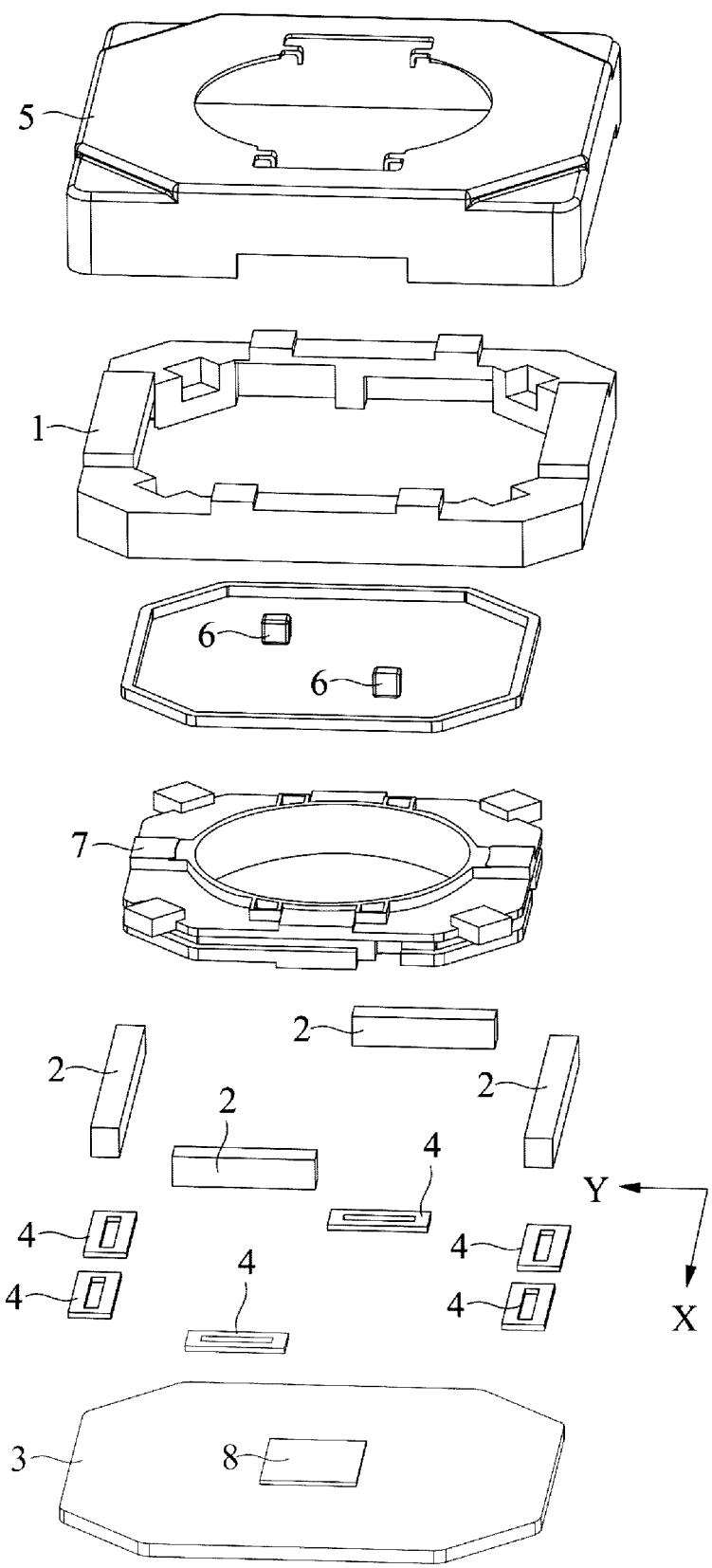
FIG. 2 is a disassembled schematic view of a stabilization driving device provided in the present disclosure.
Figure 3:
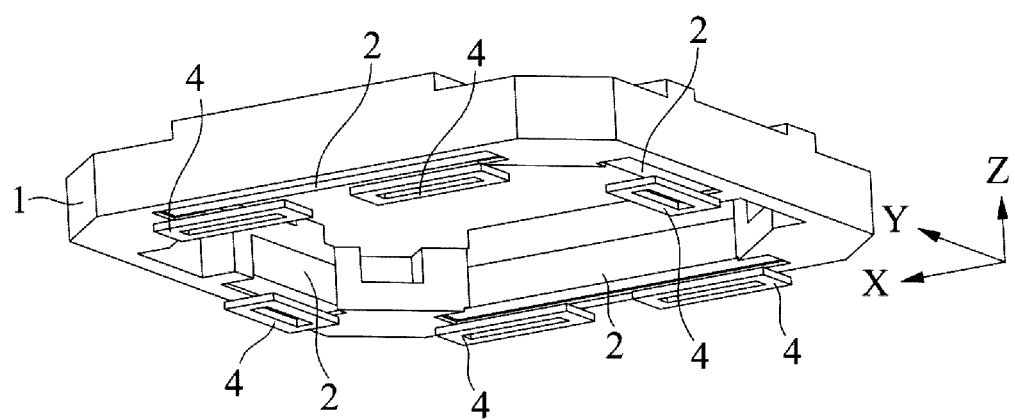
FIG. 3 is a schematic view of a correspondence of a coil and a magnetic piece of a stabilization driving device provided in the present disclosure.

As shown in FIGS. 1 to 3, this embodiment provides a magnetic driving assembly which may provide the rotational movement on the premise of achieving the translational movement. Meanwhile, a stabilization driving device including this magnetic driving assembly is further provided. The stabilization driving device may be applied to a camera of an electronic device, the electronic device refers to an electronic terminal such as a mobile phone with a stabilization function for the camera, and the stabilization driving device may provide rotational displacement driving on the premise of achieving the translation stabilization, to achieve the rotation stabilization. In the drawings, X represents a first direction, Y represents a second direction, and Z represents a third direction. According to this embodiment, the magnetic driving assembly is introduced by using the magnetic driving assembly in the stabilization driving device as an example. The magnetic driving assembly includes a frame body 1, a magnetic piece 2, a coil carrier plate 3 and multiple coils 4. The magnetic piece 2 is fixedly disposed on the frame body 1 in a plug-in manner; the coil carrier plate 3 is disposed to be separated from the frame body 1; the multiple coils 4 are disposed to correspond to the magnetic piece 2; an end of the coil carrier plate 3 in a first direction is provided with at least one coil 4 configured to drive the coil carrier plate 3 to linearly move in the first direction; an end of the coil carrier plate 3 in a second direction is provided with at least two coils 4 configured to drive the coil carrier plate 3 selectively to move linearly in the second direction or rotate around the third direction. The first direction, the second direction and the third direction are perpendicular to one another, and the third direction is perpendicular to the coil carrier plate 3. In some embodiments, the frame body 1 includes an accommodation groove 9, the accommodation groove 9 is located on a surface of the frame body 1 facing the coil carrier plate 3, and the magnetic piece 2 is disposed in the accommodation groove 9. In some embodiments, the frame body 1 is annular, a middle portion of the frame body 1 is used for arranging a lens assembly, and the accommodation groove 9 and the magnetic piece 2 are annularly arranged.

The magnetic driving assembly has the advantages that the end of the coil carrier plate 3 in the first direction is provided with the at least one coil 4 configured to drive the coil carrier plate 3 to linearly move in the first direction; the end of the coil carrier plate 3 in the second direction is provided with at least two coils 4 configured to drive the coil carrier plate 3 to move linearly in the second direction or rotate around the third direction, and thus the magnetic driving assembly can provide the rotational movement on the premise of achieving the translational movement in the first direction and the second direction, so as to adjust the position of the coil carrier plate 3. Therefore, the stabilization driving device adopting the magnetic driving assembly can achieve the rotation stabilization of the coil carrier plate 3 on the premise of achieving the translation stabilization of the coil carrier plate 3 in the first direction and the second direction, and the position of the coil carrier plate 3 can be flexibly adjusted. It is conceivable that the coil carrier plate 3 can additionally carry components that need stabilization, so as to achieve the stabilization function.

In this embodiment, as shown in FIGS. 1 to 3, the coils 4 include six coils, two ends of the coil carrier plate 3 in the first direction are respectively provided with one coil 4, and two ends of the coil carrier plate 3 in the second direction are respectively provided with two coils 4. Moreover, the two coils 4 disposed on any end of the coil carrier plate 3 in the second direction are arranged side by side in the first direction; when currents in the two of the multiple coils 4 disposed on one end of the two ends of the coil carrier plate 3 in the second direction have the same direction, the coil carrier plate 3 is driven to linearly move in the second direction; and when currents in the two of the multiple coils 4 disposed on one of the two ends of the coil carrier plate 3 in the second direction have opposite directions, the coil carrier plate 3 is driven to rotate around the third direction. In order to ensure the realization of the above functions, two ends of the frame body 1 in the first direction are respectively provided with one of the multiple magnetic pieces 2, and two ends of the frame body 1 in the second direction are respectively provided with one of the multiple magnetic pieces 2. The multiple magnetic pieces 2 are, for example, permanent magnets. The multiple magnetic pieces 2 are bipolar magnets, one pole of the magnetic piece 2 faces an inner side of the frame body 1, the other pole of the magnetic piece 2 faces an outer side of the frame body 1, and the pole of each magnetic piece 2 facing the inner side of the frame body 1 have the same polarity. The one coil 4 disposed on any end of the coil carrier plate 3 in the first direction is located between the coil carrier plate 3 and a corresponding magnetic piece 2 disposed on the frame body 1 in the first direction, and the two coils 4 disposed on any end of the coil carrier plate 3 in the second direction are located between the coil carrier plate 3 and a corresponding magnetic piece 2 disposed on the frame body 1 in the second direction.

In some embodiments, each magnetic piece 2 disposed on the two ends of the frame body 1 in the second direction has a long-strip-shaped structure extending towards the first direction and two poles in the second direction. The two coils 4 disposed on any end of the coil carrier plate 3 in the second direction are arranged side by side in the first direction and adjacent in one-to-one correspondence to the two ends of a respective one of the multiple magnetic pieces 2 in the first direction, respectively. A leftmost long-strip-shaped magnetic piece 2, a rightmost strip-shaped magnetic piece 2, and two coils 4 corresponding to each of the two long-strip-shaped magnetic pieces 2 located in the second direction as shown in FIG. 2 are used as an example, N pole of the leftmost magnetic piece 2 is located on a right side of the leftmost magnetic piece 2, S pole of the leftmost magnetic piece 2 is located on a left side of the leftmost magnetic piece 2, and the poles of the leftmost magnetic piece 2 are located in the short-edge direction of the leftmost magnetic piece 2, and two coils 4 corresponding to the leftmost magnetic piece 2 are arranged side by side in the first direction (the two coils 4 are adjacent to two ends of the corresponding long-strip-shaped magnetic piece 2 in the long-edge direction) and located between the leftmost magnetic piece 2 and the coil carrier plate 3. N pole of the rightmost magnetic piece 2 is located on a left side of the rightmost magnetic piece 2, S pole of the rightmost magnetic piece 2 is located on a right side of the rightmost magnetic piece 2, and the two poles of the rightmost magnetic piece 2 std are located in the short-edge direction of the rightmost magnetic piece 2. Two coils 4 corresponding the rightmost magnetic piece 2 are arranged side by side in the first direction (the two coils 4 are adjacent to two ends of the corresponding long-strip-shaped magnetic piece 2 in the long-edge direction) and located between the rightmost magnetic piece 2 and the coil carrier plate 3.

When currents in the two coils 4 disposed on one of the two ends of the coil carrier plate 3 in the second direction have the same direction, the coil carrier plate 3 linearly moves in the second direction; when currents in the above two coils 4 disposed on one of the two ends of the coil carrier plate 3 in the second direction have opposite directions, the coil carrier plate 3 is driven to rotate around the third direction, and the reason for rotation is that directions of forces on the two coils 4 are parallel to the second direction and are not collinear, such that a torque is generated to promote the coil carrier plate 3 to rotate. A leftmost long-strip-shaped magnetic piece 2, a rightmost long-strip-shaped magnetic piece 2, and two coils 4 corresponding to each of these two long-strip-shaped magnetic pieces 2 located in the second direction shown in FIG. 2 are used as an example. If currents in two coils 4 corresponding to the leftmost long-strip-shaped magnetic piece 2 have a forward direction, then a magnetic field generated thereof acts on this magnetic piece 2, such that these two coils 4 may move towards a positive Y direction simultaneously; if currents in two coils 4 corresponding to the rightmost long-strip-shaped magnetic piece 2 have a reverse direction, then a magnetic field generated thereof acts on this magnetic piece 2, such that these two coils 4 may move towards the positive Y direction simultaneously. When a forward current is applied to the two coils 4 of the leftmost long-strip-shaped magnetic piece 2 and a reverse current is applied to the two coils 4 of the rightmost long-strip-shaped magnetic piece 2 simultaneously, the four coils 4 may be driven to move towards the positive Y direction simultaneously so as to drive the coil carrier plate 3 to move towards the positive Y direction; otherwise, the four coils 4 may move towards a negative Y direction, and the coil carrier plate 3 is driven to move towards the negative Y direction. If currents in the two coils 4 corresponding to the leftmost long-strip-shaped magnetic piece 2 have opposite directions (for example, one coil 4 has the forward-direction current and the other coil 4 has the reverse-direction current), the magnetic field generated thereof acts on the magnetic piece 2, such that one coil of the two coils 4 may move towards the positive Y direction and the other coil of the two coils 4 may move towards the negative Y direction; and the coil carrier plate 3 is driven to positively or negatively rotate around the Z direction on an XY plane.

It should be noted that in this embodiment, the translation and rotation functions are achieved by merely adopting six coils 4 and four magnetic pieces 2, in this manner, the structure is simple, and the cost is low. Moreover, two ends of the frame body 1 in the second direction are respectively provided with a relatively long magnetic piece 2, and thus the two ends of the frame body 1 in the second direction respectively correspond to two coils 4 through one magnetic piece 2, such that a number of the magnetic pieces 2 is reduced, the assembly workload is reduced, and the assembly efficiency is improved. Two ends of the frame body 1 in the first direction are respectively provided with one relatively short magnetic piece 2, such that the volume of the magnetic pieces 2 is reduced on the premise of providing a permanent magnetic field for a respective coil 4, it is conducive to saying the arrangement space inside the magnetic driving assembly, and reducing the weight of the magnetic driving assembly.

The magnetic driving assembly further includes a control assembly. The control assembly is in an electrical control connection with the multiple coils 4 and is configured to control a magnitude and a direction of a current in each coil 4. The control assembly has a control circuit structure. In some embodiments, the coil carrier plate 3 is an existing circuit board, and the control assembly is integrally formed on the coil carrier plate 3.

Moreover, in order to enable the coil carrier plate 3 to be supported on the premise of keeping the movements, the magnetic driving assembly further includes an upper housing 5 and an elastic connecting piece (not shown in the figures), the elastic connecting piece is an existing elastic piece and may provide the elastic support, and the structure thereof will not be repeated here. The frame body 1 is disposed in an accommodation space of the upper housing 5, the coil carrier plate 3 is connected to the upper housing 5 through the elastic connecting piece such that the coil carrier plate 3 may be movably disposed on a side of the frame body 1 facing away from the upper housing 5.

The stabilization driving device adopting the magnetic driving assembly of this embodiment is mainly used for achieving the stabilization of a camera module in an existing mobile phone. As shown in FIGS. 1 to 3, the stabilization driving device further includes a Hall magnet 6 besides the magnetic driving assembly described above, and the Hall magnet 6 is an existing magnetic induction sensor. The Hall magnet 6 is disposed on the frame body 1 or the coil carrier plate 3, and the Hall magnet 6 is configured to detect a position of the frame body 1 relative to the coil carrier plate 3. The Hall magnet 6 is in a signal connection with the control assembly, the control assembly may receive a position signal sent by the Hall magnet 6, the magnitude and the direction of the current in each coil 4 are controlled according to a deviation amount generated in a shooting process, thus the coil carrier plate 3 is caused to perform the translational movement in the first direction and the second direction and the rotational movement, such that a deviation error generated by the shaking is compensated, and the shooting effect is improved. The Hall magnet 6 shown in the drawings is merely an example and may be a combination or module of an existing Hall magnet and a Hall chip; alternatively, the Hall magnet 6 may also be a separate Hall magnet, and this Hall magnet is electrically connected to a Hall chip located at another position.

Furthermore, the stabilization driving device further includes a lens assembly (not shown in the figures) and an image sensor 8. The lens assembly is disposed on the frame body 1; the image sensor 8 is disposed on the coil carrier plate 3 and configured to receive optical information from the lens assembly. The lens assembly includes a lens bracket 7 and a lens (not shown in the figures), the lens bracket 7 is fixed on the annular frame body 1 in a plug-in manner, and the lens is inserted into a middle through-hole of the lens bracket 7. Due to the fact that the image sensor 8 is fixed on the coil carrier plate 3, when shooting, a position of the coil carrier plate 3 may be compensated and adjusted through the linear movement in the first direction and the second direction and the rotation, thus the shooting effect is ensured, and the good stabilization effect is achieved.

The above contents are merely exemplary embodiments of the present disclosure, for those of ordinary skill in the art, there will be changes in the implementations and application scope according to the idea of the present disclosure. The contents of the present description should not be construed as limiting the present disclosure.

What is claimed is:

1. A magnetic driving assembly, comprising:
   a frame body, wherein an inner side of the frame body is configured to arrange a lens bracket;
   a plurality of magnetic pieces, which are disposed on the frame body;
   a coil carrier plate, which is disposed to be separated from the frame body and is configured to arrange an image sensor; and
   a plurality of coils, which are disposed to correspond to the plurality of magnetic pieces; wherein each of two ends of the coil carrier plate in a first direction is provided with one of the plurality of coils configured to drive the coil carrier plate to linearly move in the first direction, each of two ends of the coil carrier plate in a second direction is provided with two coils of the plurality of coils configured to drive the coil carrier plate selectively to move linearly in the second direction or rotate around a third direction, each of two ends of the frame body in the second direction is provided with one of the plurality of magnetic pieces corresponding to the two coils on the respective end; wherein each magnetic piece on the two ends of the frame body in the second direction has two poles in the second direction, and the two coils on each of the two ends of the coil carrier plate in the second direction are arranged side by side in the first direction and adjacent in one-to-one correspondence to two ends of a respective one of the plurality of magnetic pieces in the first direction, respectively; wherein, the first direction, the second direction and the third direction are perpendicular to one another, and the third direction is perpendicular to the coil carrier plate.

2. The magnetic driving assembly of claim 1, further comprising:
   a control assembly, which is in an electrical control connection with the plurality of coils and is configured to control a magnitude and a direction of a current in each of the plurality of coils.

3. The magnetic driving assembly of claim 1, wherein the plurality of coils comprise six coils.

4. The magnetic driving assembly of claim 3, wherein in a case where currents in the two of the plurality of coils disposed on one of the two ends of the coil carrier plate in the second direction have a same direction, the coil carrier plate is driven to linearly move in the second direction; and in a case where currents in the two of the plurality of coils disposed on one of the two ends of the coil carrier plate in the second direction have opposite directions, the coil carrier plate is driven to rotate around the third direction.

5. The magnetic driving assembly of claim 3, wherein the one of the plurality of coils disposed on any end of the coil carrier plate in the first direction is located between the coil carrier plate and a respective one of the plurality of magnetic pieces disposed on the frame body in the first direction, and the two of the plurality of coils disposed on any end of the coil carrier plate in the second direction are located between the coil carrier plate and a respective one of the plurality of magnetic pieces disposed on the frame body in the second direction.

6. The magnetic driving assembly of claim 5, wherein the plurality of magnetic pieces are bipolar magnets, one pole of each of the plurality of magnetic pieces faces an inner side of the frame body, the other pole of each of the plurality of magnetic pieces faces an outer side of the frame body, and poles of the plurality of magnetic pieces facing the inner side of the frame body have a same polarity.

7. The magnetic driving assembly of claim 6, wherein each magnetic piece disposed on the two ends of the frame body in the second direction has a long-strip-shaped structure extending towards the first direction.

8. The magnetic driving assembly of claim 1, further comprising:
an upper housing, wherein the frame body is disposed in an accommodation space of the upper housing; and
an elastic connecting piece, wherein the coil carrier plate is connected to the upper housing through the elastic connecting piece such that the coil carrier plate is movably disposed on a side of the frame body facing away from the upper housing.

9. A stabilization driving device, comprising:
the magnetic driving assembly of claim 1; and
a Hall magnet, which is disposed on the frame body or the coil carrier plate and is configured to detect a position of the frame body relative to the coil carrier plate.

10. The stabilization driving device of claim 9, further comprising:
the lens bracket; and
the image sensor, which is configured to receive optical information from the lens bracket.

11. The stabilization driving device of claim 9, wherein the magnetic driving assembly further comprises:
a control assembly, which is in an electrical control connection with the plurality of coils and is configured to control a magnitude and a direction of a current in each of the plurality of coils.

12. The stabilization driving device of claim 9, wherein the plurality of coils comprise six coils.

13. The stabilization driving device of claim 12, wherein in a case where currents in the two of the plurality of coils disposed on one of the two ends of the coil carrier plate in the second direction have a same direction, the coil carrier plate is driven to linearly move in the second direction; and in a case where currents in the two of the plurality of coils disposed on one of the two ends of the coil carrier plate in the second direction have opposite directions, the coil carrier plate is driven to rotate around the third direction.

14. The stabilization driving device of claim 12, wherein the one of the plurality of coils disposed on any end of the coil carrier plate in the first direction is located between the coil carrier plate and a respective one of the plurality of magnetic pieces disposed on the frame body in the first direction, and the two of the plurality of coils disposed on any end of the coil carrier plate in the second direction are located between the coil carrier plate and a respective one of the plurality of magnetic pieces disposed on the frame body in the second direction.

15. The stabilization driving device of claim 14, wherein the plurality of magnetic pieces are bipolar magnets, one pole of each of the plurality of magnetic pieces faces an inner side of the frame body, the other pole of each of the plurality of magnetic pieces faces an outer side of the frame body, and poles of the plurality of magnetic pieces facing the inner side of the frame body have a same polarity.

16. The stabilization driving device of claim 15, wherein each magnetic piece disposed on the two ends of the frame body in the second direction has a long-strip-shaped structure extending towards the first direction.

17. The stabilization driving device of claim 9, wherein the magnetic driving assembly further comprises:
an upper housing, wherein the frame body is disposed in an accommodation space of the upper housing; and
an elastic connecting piece, wherein the coil carrier plate is connected to the upper housing through the elastic connecting piece such that the coil carrier plate is movably disposed on a side of the frame body facing away from the upper housing.

* * * * *